Figure 1:
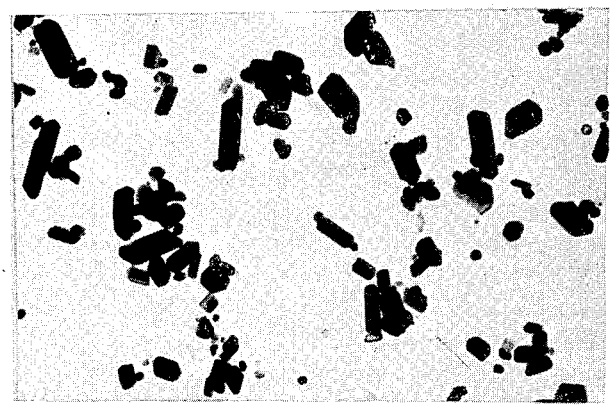

United States Patent [19]  
Claridge et al.

[11] 3,862,297  
[45] Jan. 21, 1975

[54] MANUFACTURE OF PIGMENTARY TITANIUM DIOXIDE
[75] Inventors: Maurice Arthur Claridge, Grimsby; Richard Vyvian Pearse, Cleethorees, both of England
[73] Assignee: Laporte Industries Limited, London, England
[22] Filed: Dec. 14, 1970
[21] Appl. No.: 97,541

[30] Foreign Application Priority Data
Dec. 24, 1969 Great Britain............... 62927/69

[52] U.S. Cl.............. 423/615, 423/616, 136/300
[51] Int. Cl... C01g 23/04, C01g 23/08, C01g 23/06
[58] Field of Search........... 23/202 R, 117; 423/615, 423/616

[56] References Cited
UNITED STATES PATENTS

| 1,760,513 | 5/1930 | Monk et al. | 23/202 R X |
| 2,069,554 | 2/1937 | Monk et al. | 23/202 R |
| 2,273,431 | 2/1942 | Booge | 23/202 R |
| 2,290,539 | 7/1942 | Cole | 23/202 R X |
| 2,307,048 | 1/1943 | Keats | 23/202 R |
| 2,369,246 | 2/1945 | Peterson | 23/202 R X |
| 2,379,019 | 6/1945 | McCord et al. | 23/202 R X |
| 2,448,683 | 9/1948 | Peterson | 23/202 R |
| 2,622,010 | 12/1952 | Mayer | 23/202 R |
| 2,622,011 | 12/1952 | Mayer | 23/202 R |
| 2,622,012 | 12/1952 | Mayer | 23/202 R |
| 2,766,133 | 10/1956 | Marcot et al. | 23/202 R X |
| 3,071,439 | 1/1963 | Solomka | 23/202 R |
| 3,202,524 | 8/1965 | Richmond | 23/202 R X |
| 3,337,300 | 8/1967 | Hughes | 23/202 R |
| 3,518,053 | 6/1970 | Kolznak et al. | 423/615 |
| 3,579,310 | 5/1971 | Lewis | 23/202 R |
| 3,632,527 | 1/1972 | Alpert et al. | 23/202 R |

FOREIGN PATENTS OR APPLICATIONS
580,734  9/1946  Great Britain.................. 423/615

Primary Examiner—Edward Stern  
Attorney, Agent, or Firm—Kane, Dalsimer, Kane, Sullivan and Kurucz

[57] ABSTRACT

The process comprises hydrolysing a solution of titanium sulphate, washing the titanium dioxide hydrolysate, and then calcining the hydrolysate at a temperature from 750 to 1000°C. to yield titanium dioxide pigment having desirable properties in terms of brightness, opacity, and/or texture. A rutile-promoting seed is incorporated with the titanium sulphate solution and/or with the hydrolysate. In the process, the pH of the wet hydrolysate is in the range of from 6 to 10 immediately before calcination, and there is present in the hydrolysate immediately before calcination an ammonium compound that will be expelled, together with any decomposition products thereof, during calcination; a treating agent or agents selected from beryllium, aluminium, magnesium, zinc and compounds thereof, and a treating agent or agents selected from sodium potassium, rubidium, caesium, and compounds thereof, with the proviso that lithium and/or a lithium compound may be substituted for any or all of the agent or agents selected from the first-mentioned and/or second-mentioned group. The total quantity of the ammonium compound is at least 0.7 percent (calculated as ammonium sulphate); the total quantity of agents from the first-mentioned group is from 0.02 to 0.50 percent (calculated as the metal oxide or oxides); and the total quantity of agents from the second-mentioned group is from 0.05 to 1.0 percent (calculated as the alkali metal oxide or oxides). All the percentages are by weight and are based on the weight of titanium dioxide. The ammonium compound and the treating agent or agents may be incorporated with the hydrolysate in any order. Conveniently, any necessary pH adjustment is effected at least in part by using an alkaline ammonium compound.

7 Claims, 3 Drawing Figures

MAG X 20,000

MAG X 20,000

MAG X 20,000

MAG X 20,000

MANUFACTURE OF PIGMENTARY TITANIUM DIOXIDE

This invention relates to the manufacture of pigmentary titanium dioxide.

Titanium dioxide suitable for use as a pigment may be obtained by hydrolysing a solution of a titanium compound, for example, a solution derived from the sulphation of ilmenite, and thereafter calcining the resulting hydrolysate, which comprises hydrous titanium dioxide, in order to develop pigmentary properties. The process may be carried out so that the product titanium dioxide is in either the anatase or the rutile crystallographic form.

The more important pigmentary properties include brightness, opacity, and texture, and various proposals have previously been made for improving these properties. The existing proposals relate, in general, to pre-calcination treatments of various kinds. Thus, for example, British Pat. No. 846,085 discloses a process in which titanium dioxide hydrolysate obtained by hydrolysis of a solution of titanium sulphate is washed, neutralised with ammonia or with an alkaline ammonium compound, subjected to further washing to remove the ammonium sulphate produced in the neutralisation step, and thereafter calcined to yield pigmentary titanium dioxide. The water used in the washing to remove ammonium sulphate is substantially freed from calcium and magnesium ions before use, but the incorporation of a water-insoluble zinc compound with the hydrolysate before calcination is said to enhance the tinting strength of the resulting pigment.

It has hitherto been a common feature of pre-calcination neutralisation treatments that soluble salts formed during the neutralisation or otherwise are removed by washing prior to calcination, and it has been suggested that the removal by washing of soluble sulphates, for example, ammonium sulphate, formed on neutralisation of titanium dioxide hydrolysate, is assisted by incorporating with the hydrolysate compounds of elements forming insoluble oxides, hydroxides, carbonates, or basic carbonates. Examples of such elements that have been proposed include cadmium, lanthanum, cerium, zirconium, thorium, niobium, tantalum, and antimony.

The present invention provides a process for the manufacture of pigmentary titanium dioxide, which comprises hydrolysing a solution of titanium sulphate to yield a precipitate of hydrous titanium dioxide, incorporating a rutile-promoting seed with the solution of titanium sulphate and/or with the precipitate, washing the precipitate and treating the washed precipitate with one or more conditioning agents selected from lithium, beryllium, aluminium, magnesium, zinc, sodium, potassium, rubidium, caesium and compounds of the said metals, treating the precipitate with a total quantity of at least 0.7 percent by weight of an ammonium compound or of ammonium compounds (calculated as ammonium sulphate and based on the weight of titanium dioxide), thereafter calcining the precipitate and ensuring that the pH of the wet precipitate is in the range of from 6 to 10 immediately before calcination, the calcination being carried out at a temperature in the range of from 750° to 1000°C to yield pigmentary titanium dioxide, and the quantity of the treating agent or agents being such that there is in the precipitate immediately before calcination a total quantity of an agent or of agents selected from the group consisting of beryllium, aluminium, magnesium, zinc, and compounds of the said metals (the quantity of the or each agent being calculated as the metal oxide) within the range of from 0.02 to 0.50 percent by weight and based on the weight of the titanium dioxide, and a total quantity in the precipitate immediately before calcination of an agent or agents selected from the group consisting of sodium, potassium, rubidium, caesium, and compounds of the said metals (the quantity of the or each agent being calculated as the alkali metal oxide) within the range of from 0.05 to 1.0 percent by weight based on the weight of the titanium dioxide, provided that lithium and/or one or more lithium compounds may be substituted for any or all of the treating agent or agents selected from the first-mentioned and/or the second-mentioned group.

Titanium dioxide pigment manufactured by the process of the present invention has superior brightness, opacity and/or texture as compared with titanium dioxide pigments produced by conventional processes.

The total quantity of the or each treating agent may be incorporated with the precipitate either before or after carrying out any pH adjustment that may be necessary. Alternatively, quantities of the or each treating agent may be incorporated with the precipitate both before and after such pH adjustment, provided only that the total proportion of the treating agent or agents present in the precipitate immediately before calcination is within the appropriate range as hereinbefore specified. It will, of course, be appreciated that certain of the treating agents will themselves have some effect on the pH of the wet precipitate.

The concentration in the precipitate of any impurities such as, for example, iron, vanadium and chromium should be at or below an acceptable maximum level, say below 50 parts per million (ppm) in the case of iron and at or below 3 ppm in the case of vanadium and chromium, before the treatment and pH adjustment steps are carried out. If such impurities are allowed to remain with the titanium through the remaining process steps, the resulting titanium dioxide pigment is discoloured owing to the presence of compounds of the impurity elements. The washing of the precipitate serves to remove at least part of any of these impurities, and also washes away part of the sulphuric acid remaining after the hydrolysis. It may be necessary, however, in order to lower the concentration of impurities to an acceptable level, to supplement the washing step by an acid-treatment. It is also possible to reduce the amount of any chromium and vanadium impurities present initially in the precipitate by carrying out a pre-hydrolysis purification treatment.

For several reasons, it is undesirable to attempt to remove impurities by washing the precipitate after it has been subjected to treatment and pH adjustment in accordance with the invention. Firstly, such washing alters the state of flocculation of the precipitate and so impairs the properties, for example, the texture and undertone, of the pigment ultimately obtained by calcination. In extreme cases, the state of flocculation may be altered to such an extent that peptisation occurs, and this is especially likely when the pH of the precipitate has been adjusted to a value towards the higher end of the specified range. Secondly, there is a considerable risk that at least part of any soluble treating agent that has been incorporated with the precipitate will be removed by such washing, and this may necessitate replenishing the precipitate with the treating agent in order to ensure that the quantity of that agent present in the precipitate immediately prior to calcination is within the appropriate range as hereinbefore specified. Thirdly, such washing will remove at least part of the ammonium compound or compounds present, and such removal may reduce the total quantity of the ammonium compound or compounds present below 0.7 percent by weight (calculated as ammonium sulphate and based on the weight of titanium dioxide). It would then be necessary to incorporate a further quantity of ammonia or an ammonium compound with the precipitate, and this further addition might in turn entail the risk of raising the pH of the precipitate above the specified maximum.

Although it is undesirable to wash the precipitate after the treatment step and any necessary pH adjustment step, excess liquid may be removed from the precipitate immediately prior to calcination, for example, by filtration, provided that the pre-calcination levels of ammonium compounds and of the treating agent or agents are maintained within the specified ranges.

The or each treating agent is advantageously a compound of one of the said metals and is preferably a water-soluble compound. A water-insoluble compound may be used, but such compounds must be thoroughly mixed-in with the precipitate if good results are to be obtained. Such mixing may be carried out by means of a high shear rate mixer, for example, a Frenkel screw.

The or each compound selected from the first-mentioned group may be a simple salt, for example, a sulphate, chloride, or nitrate; a basic salt, for example, an oxychloride or a basic sulphate; a base, for example, an oxide or hydroxide; a salt of an organic acid, for example, a formate, acetate, or oxalate; or an organometallic compound, for example, a metal alkyl or alkoxide. Advantageously, the or each compound selected from the first-mentioned group is added to an aqueous slurry of the precipitate, and is preferably added in the form of an aqueous solution.

Preferably, the total proportion of the treating agent or agents selected from the first-mentioned group and present in the precipitate immediately before calcination is in the range of from 0.02 to 0.2 percent by weight (calculated as the metal oxide or oxides and based on the weight of titanium dioxide).

The or each compound selected from the second-mentioned group may be a simple salt, for example, a sulphate, nitrate, or chloride; a basic compound, for example, an oxide, hydroxide, carbonate, or bicarbonate; a salt of an organic acid, for example, an acetate, oxalate, or benzoate; or an organometallic compound, for example, an alkoxide. Preferably, the or each compound selected from the second-mentioned group is a sodium compound. As in the case of compounds from the first-mentioned group, the or each compound from the secondmentioned group is advantageously added to an aqueous slurry of the precipitate, and is preferably added in the form of an aqueous solution.

Preferably, the total proportion of the treating agent or agents selected from the second-mentioned group present in the precipitate immediately before calcination is in the range of from 0.1 to 0.6 percent by weight (calculated as the alkali metal oxide or oxides).

The or each lithium compound may be any of the compounds mentioned hereinbefore in relation to the second-mentioned group, is advantageously added to an aqueous slurry of the precipitate, and is preferably added in the form of an aqueous solution.

An advantageous form of the process of the invention is that in which the only treating agent or agents used is or are lithium and/or one or more lithium compounds.

The or each treating agent may be incorporated with the precipitate by adding a mixed aqueous solution of the or each agent to an aqueous slurry of the precipitate.

In general, the pH of the wet precipitate will not be within the specified range after the washing step, and pH adjustment will be required.

Advantageously, any pH adjustment is carried out at least in part by using as ammonium compound an alkaline ammonium compound, for example, ammonium hydroxide or ammonium carbonate. Provided, however, that the pre-calcination requirements in terms of pH and in terms of the total proportion of the ammonium compound or compounds and of the treating agent or agents are satisfied, the pH adjustment may be carried out at least in part by means of any alkaline agent. Thus, for example, the pH of the wet precipitate may be raised to slightly below 6 by treatment with ammonia or with an alkaline ammonium compound, the pH adjustment then being completed by treating the hydrolysate with a hydroxide or carbonate of an alkali metal or of an alkaline earth metal. Alternatively, the pH of the wet precipitate may be raised to a certain extent by treatment with, for example, sodium hydroxide, followed by treatment with ammonia or an ammonium compound. In some cases, it may be possible to add a quantity of an alkaline agent which is such that the maximum prescribed proportion of the treating agent is exceeded, and then to reduce the proportion of that agent to within the specified range by de-watering or washing the precipitate. As is explained hereinbefore, however, washing at this stage is generally undesirable owing, inter alia, to the disadvantageous effect on the flocculation of the hydrolysate.

If the pH of the precipitate were not to be raised to at least 6 before calcination, then the calcination step would produce pigments having inferior brightness and texture. Preferably, the pH of the wet precipitate is 7 immediately prior to calcination.

The incorporation of a total quantity of at least 0.7 percent by weight of an ammonium compound or compounds (calculated as ammonium sulphate) with the precipitate causes it to be in a desirable state of aggregation before it is calcined, with the result that the product pigment has superior hiding power and tinting strength. The presence of the ammonium compound or compounds also results in the pigment obtained by calcination being less aggregated and having a softer texture as compared with pigment manufactured by conventional processes, and the total proportion of the ammonium compound or compounds is advantageously at least 4.0 percent by weight (calculated as ammonium sulphate), when these effects are especially marked.

It will generally be found that little or no advantage is gained by using a total proportion of the ammonium compound or compounds above about 15 percent by weight calculated as ammonium sulphate.

Advantageously, the ammonium compound is ammonium hydroxide or ammonium carbonate. The ammonium compound may, however, be formed in situ, for example, by passing gaseous ammonia through an aqueous slurry of the precipitate.

The reason why the presence of the specified proportion of the ammonium compound or cmpounds before the calcination step improves the hiding power and texture of the product pigment is not fully understood, but it seems probable that the beneficial results are due to a combination of the effect of the ammonium compound or compounds on the state of aggregation of the hydrous titanium dioxide before calcination and of the way in which the ammonium compound or compounds are driven off in the course of calcination. It is found that when titanium dioxide hydrolysate that has been treated in accordance with the present invention is calcined in a rotary kiln, the ammonium compound or compounds, and/or decomposition products, are expelled from the titanium dioxide at the relatively low temperatures which occur before any substantial conversion of the hydrolysate into rutile titanium dioxide takes place. This decomposition and evolution may assist in breaking down the lumps formed during the drying which occurs at these relatively low temperatures, and so reduce the tendency of such lumps to coalesce into hard aggregates.

If no ammonium compound were to be incorporated with the precipitate prior to calcination, the evolution and expulsion of residual sulphate or sulphuric acid would occur over a much longer period and at a later stage of the process, when hard aggregates have already been formed by the initial drying-out which occurs in the early stages of calcination.

Any rutile-promoting seed can be used, and the seed may be added before or after hydrolisis. An example of a seed which may be added before hydrolysis is the nucleous liquid obtained by diluting and then heating an acidic solution of a metal titanate, as described in British Pat. No. 623,813. An example of a seed which may be added after hydrolysis is the seed obtained by heating the mixture that results from treating an alkali metal titanate with a monobasic acid and with a titanous compound, as described in U.S. Pat. No. 2,389,026. If desired, both a pre-hydrolysis seed and a post-hydrolysis seed may be used. When the precipitate itself is to be seeded, the seed may be added at any time prior to calcination, but is preferably added after the beginning of the washing process, but before it has been completed.

When the rutile-promoting seed is a compound of one of the elements specified hereinbefore as a treating agent, care must of course be taken to ensure that, allowing for the quantity deriving from the rutile-promoting seed, the prescribed maximum proportion of that element present in the precipitate immediately before calcination is not exceeded. As has been explained hereinbefore in relation to the use of alkaline compounds of the specified elements in the pH adjustment step, it may sometimes be possible to remove an excess of a particular treating agent by a de-watering or washing treatment.

It is important that the calcination conditions during the period in which pigmentary properties are developed should be carefully controlled so as to ensure that the growth rate of the rutile titanium dioxide particles is not too high. Thus, if the calcination is carried out in a conventional kiln, a relatively small rate of temperature increase with respect to time should be employed, resulting in a long rutilisation zone and a relatively low maximum temperature. Calcination for short periods at high temperatures leads to excessive particle growth which in turn impairs the undertone of the resulting pigments. The final stages of the transformation from anatase to rutile, that is to say, from 90 percent rutile upwards, take place relatively slowly during calcination of hydrolysate which has been treated in accordance with the invention, so facilitating precise control of these important stages.

The minimum calcination temperature required in order to convert the precipitate into the rutile crystallographic form depends both on the particular treating agents employed and on the proportion of those agents present in the precipitate immediately prior to calcination. In general, a precipitate containing zinc or lithium treating agents will not require as high a minimum calcination temperature as will be required by a precipitate containing beryllium, magnesium or aluminium treating agents. Also, the presence of potassium, rubidium or caesium treating agents tends to increase the required minimum calcination temperature. For example, precipitate containing 0.5 percent by weight of lithium oxide requires a minimum temperature of from 750° to 800°C., whereas a minimum temperature of at least 950°C. is required for a precipitate containing 0.5 percent by weight of aluminium oxide and 0.4 percent by weight of potassium oxide.

Advantageous combinations of treating agents include magnesium and sodium treating agents (preferably, from 0.05 to 0.15 percent by weight of magnesium and from 0.1 to 0.3 percent by weight sodium); zinc and sodium treating agents (preferably, from 0.05 to 0.25 percent of zinc and from 0.1 to 0.3% by weight of sodium); and zinc and potassium treating agents (preferably, from 0.05 to 0.25 percent by weight of zinc and from 0.05 to 0.25 percent by weight of potassium). All of the above percentages are calculated as the metal oxide and based on the weight of titanium dioxide.

Pigmentary titanium dioxide particles produced in accordance with the invention have a characteristic shape, and contain a high proportion of well-formed crystals having clearly defined straight edges. An especially desirable property of the finished pigment is that the particles also contain a high proportion of crystals of acicular habit, which render the pigment especially useful in opacifying paper.

The proportion of acicular crystals in the product pigment can be varied by altering the proportion of the treating agents within the specified ranges. In general, decreasing the total proportion of the treating agent or agents selected from the first-mentioned group and increasing the total proportion of the treating agent or agents from the secondmentioned group tends to favour the formation of acicular crystals. Especially good results are obtained when the total proportion of the treating agent or agents selected from the first-mentioned group does not exceed 0.25 percent by weight and the total proportion of the agent or agents selected from the second-mentioned group is at least 0.2 percent by weight. If the total proportion of the treating agent or agents from the first-mentioned group were to be increased above 0.5 percent by weight, the advantageous crystalline characteristics would be progressively lost.

It will generally be found that the presence of one or more lithium treating agents in the precipitate immediately before calcination tends to favour the formation of acicular crystals, and that increasing the quantity of such agents leads to an increase in the proportion of acicular crystals in the product pigment.

The formation of acicular crystals is also favoured by a relatively slow rate of rutile formation, for example, that rate of rutile formation which is caused in a rotary kiln by a rate of increase of temperature of the precipitate of less than 1°C. per minute.

Pigmentary titanium dioxide obtained by calcination contains a proportion of sintered aggregates, which tend to impair the pigmentary properties, but it is found that the number of crystals per aggregate in pigment produced in accordance with the invention is less than that in pigment produced by conventional processes. In consequence, the potential carbon black undertone value (C.B.U.) can be satisfactorily developed merely by rolling the product pigment, whereas it is necessary to carry out both a dry milling step and an intensive wet milling step, for example, sand milling, in order to develop satisfactorily the undertone of pigment produced in a conventional way.

Although sand-milling is not necessary in order to develop undertone, it is nevertheless advantageous to subject the product pigment to a wet-milling process after calcination, in order to obtain a pigment which, when incorporated in a paint medium, yields a paint having optimum gloss retention.

An advantage of the characteristic shape of the pigmentary particles obtained in accordance with the invention is that such particles have relatively low abrasiveness, making them very useful for delustreing fibres and for use in printing inks. The particles also have a lower oil absorption value as compared with pigment obtained by conventional processes.

Pigmentary titanium dioxide produced in accordance with the invention may be subjected to surface treatment before use or may be used untreated. In order to enable the pigment to be used without surface treatment, it is necessary to restrict its water-soluble content, and for this purpose the total proportion of treating agent selected from the secondmentioned group is advantageously less than 0.2 percent by weight. If the water-soluble content of the pigment is not restricted in this way or otherwise, the pigment tends to be dispersed unsatisfactorily into a paint medium.

Preferably, the pigment is leached before being subjected to surface-treatment. It is especially important to carry out a leaching process prior to surface treatment when the precalcination proportion of the treating agent or agents selected from the second-mentioned group exceeds 0.4 per cent. When lithium or a lithium compound is used as the treating agent or as one of the treating agents, it is preferable for economic reasons to leach the finished pigment to recover the lithium in part. The resulting leach liquor may then be concentrated and used to treat fresh titanium dioxide hydrolysate.

The invention also provides a paint, plastics material enamel or elastomeric material that incorporates titanium dioxide pigment manufactured in accordance with the invention.

The following Examples illustrate the invention:-

EXAMPLE 1

A titanium sulphate solution that had been obtained by digesting an Australian ilmenite in concentrated sulphuric acid and dissolving the digestion products in water, was treated with scrap iron in order to reduce all of the dissolved iron to the ferrous state. The composition of the Australian ilmenite was as follows:

|  | % by weight |
|---|---|
| $TiO_2$ | 53.7 |
| FeO | 22.0 |
| $Fe_2O_3$ | 20.1 |
| $Al_2O_3$ | 0.51 |
| $V_2O_5$ | 0.13 |
| $Cr_2O_3$ | 0.03 |
| $Nb_2O_5$ | 0.17 |
| $ZrO_2$ | 0.1 |
| MnO | 1.5 |

An organic flocculating agent was then added and the resulting solution was clarified to remove undissolved matter and cooled until ferrous sulphate crystallised out. Sufficient of the crystalline ferrous sulphate was removed to give a titanium dioxide : iron ratio of about 3.1 : 1.0 by weight. The concentration of titanium dioxide in the solution was then increased to 225 grams per litre by evaporation under reduced pressure, yielding a titanium sulphate solution suitable for hydrolysis. 2 Percent by weight of rutile inducing nuclei (based on the weight of titanium dioxide), which had been prepared from a titanium tetrachloride solution, were added to this solution, which was then boiled under reflux at constant volume for 3 hours to precipitate hydrous titanium dioxide.

The hydrous titanium dioxide was thoroughly washed to reduce the concentration of iron and other impurities to as low a level as possible, and was then neutralised to pH 7.0 with a 35 percent ammonia solution. After the neutralisation step, excess water was removed from the hydrolysate by filtration, but no washing treatment was applied. The resulting filter cake, which had a solids content of 35.3 percent by weight and contained 11 percent by weight of ammonium ions (calculated as ammonium sulphate and based on the weight of $TiO_2$), was then divided into several parts, which were treated as follows:

0.4 percent by weight of sodium sulphate (calculated as $Na_2O$), and either 0.1 percent or 0.5 percent by weight of a compound of silicon, tin, lithium, beryllium, calcium, zirconium, magnesium, aluminium, cadmium, bismuth, or zinc (calculated as the oxide of the element) was added to each part. Except in the case of silicon, tin and bismuth, each element was added in the form of a mixed solution of its sulphate with sodium sulphate.

Silicon was added in the form of a slurry of finely divided silica in the sodium sulphate solution; tin was added in the form of a mixed solution of stannous chloride and the sodium sulphate; and bismuth was added in the form of a suspension of bismuthyl nitrate in the sodium sulphate solution.

The treated portions of the neutralised hydrous titanium dioxide were than calcined over a period of 2½ hours in a laboratory muffle furnace to yield pigmentary titanium dioxide of which 98 percent was in the rutile form. In each case, the calcination temperature was in the range of from 780° to 1,000°C, the exact temperature depending on the particular treating agent selected. Thus, for example, the portion of the hydrous titanium dioxide that had been treated with lithium sulphate/sodium sulphate was calcined at 780°C., and the portion that had been treated with aluminium sulphate/sodium sulphate was calcined at 950°C.

The brightness of each sample of pigment was measured using a differential colorimeter, and the brightness value of each pigment on the Adams Chromatic Value System is given in the Table below which shows the pre-calcination proportions of the treating agents (all the percentages being by weight). In the Adams System, $L$ represents a logarithmic function of the brightness, referred to a smoked magnesium oxide surface (for which $L = 100$), it being desirable to have as high an $L$ value as possible.

| Sample | Precalcination Treatment | | colour Brightness |
|---|---|---|---|
| | % Oxide | % Na$_2$O | 'L' Value |
| 1 | 0.1 SiO$_2$ | 0.4 | 93.3 |
| 2 | 0.5 SnO$_2$ | 0.4 | 93.1 |
| 3 | Nil | 0.4 | 93.4 |
| 4 | 0.1 Li$_2$O | 0.4 | 97.5 |
| 5 | 0.1 BeO | 0.4 | 96.4 |
| 6 | 0.5 CaO | 0.4 | 93.1 |
| 7 | 0.1 ZrO$_2$ | 0.4 | 92.9 |
| 8 | 0.1 MgO | 0.4 | 97.0 |
| 9 | 0.1 Al$_2$O$_3$ | 0.4 | 96.6 |
| 10 | 0.5 CdO | 0.4 | 92.9 |
| 11 | 0.1 BiO | 0.4 | 92.9 |
| 12 | 0.1 ZnO | 0.4 | 97.3 |

It can be seen from the above Table that the brightness of the pigmentary material obtained by calcination of those parts of the neutralised hydrolysate that had been treated with sodium sulphate and a compound of one of the elements beryllium, lithium, aluminium, magnesium, or zinc (as in Samples 4, 5, 8, 9 and 12) is superior to that of pigment obtained either by calcination of the parts of the neutralised hydrolysate that had been treated with sodium sulphate and a compound of silicon, tin, cadmium, bismuth, calcium, or zirconium (Samples 1, 2, 6, 7, 10 and 11) or by calcination of neutralised hydrolysate that had been treated with sodium sulphate only.

EXAMPLE 2

A titanium sulphate solution suitable for hydrolysis, that had been obtained from a mixture of three parts by weight, of Norwegian ilmenite and one part by weight of Australian ilmenite by the sequence of steps described in Example 1, contained 215 grams/litre titanium dioxide, 75 grams/litre iron, 572 grams/litre sulphuric acid, and 1.5 grams/litre trivalent titanium.

A hydrolysis nucleating seed was prepared by diluting, neutralising, and then heat treating a small part of the titanium sulphate solution, and was incorporated with the main part of the solution to the extent of 0.6 percent by weight, based on the weight of titanium dioxide. After being seeded, the solution was boiled for 3½ hours under reflux at constant volume, causing hydrous titanium dioxide to be precipitated.

The hydrous titanium dioxide precipitate was thoroughly washed to reduce the concentration of iron and other impurities to as low a level as possible, the washing being carried out with water that had been rendered slightly acidic with sulphuric acid, in order to prevent precipitation of any iron compounds.

Rutile inducing nuclei were prepared from part of the washed titanium dioxide hydrolysate by digesting it in caustic soda to form sodium titanate, washing the sodium titanate to remove excess caustic soda and any sulphate present, and then peptising the washed titanate with hydrochloric acid.

An aqueous slurry having a titanium dioxide content of 250 grams/litre was prepared from the main part of the washed hydrolysate, and the rutile inducing seed was incorporated with the aqueous slurry to the extent of 2 percent by weight, based on the weight of titanium dioxide. The resulting seeded slurry was then divided into 14 parts which were treated as follows:

Part 1:
A quantity of potassium sulphate solution equivalent to 0.43 percent by weight of potassium oxide (based on titanium dioxide) was incorporated with the well agitated slurry. The slurry was then neutralised to pH 8.0 with a 35 percent solution of ammonia, and de-watered by filtration. The resulting filter cake had a solids content of 35.5 percent and contained 15 percent by weight of ammonium ions (calculated as ammonium sulphate). Analysis of the filter cake showed that 49.8 percent of the potassium sulphate had been removed by the filtration. The filter cake was then calcined at 930°C. for 3 hours in a muffle furnace, yielding pigmentary titanium dioxide of which 98 percent was in the rutile crystallographic form.

There being no compound of beryllium, lithium, aluminium, magnesium, or zinc present in the filter cake immediately before calcination, the pre-calcination treatment applied to Part 1 was outside the scope of the present invention.

Part 2:
A quantity of a mixed solution of magnesium sulphate and potassium sulphate, equivalent to 0.012 percent by weight of magnesium oxide and 0.4 percent by weight of potassium oxide (each percentage being based on the weight of titanium dioxide) was added to the well-agitated slurry. The slurry was then neutralised to pH 8.0 using a 20 percent solution of ammonia and the neutralised slurry was filtered to remove excess water. The amounts of potassium and magnesium in the resulting filter cake were equivalent to 0.01 percent magnesium oxide and 0.2 per cent potassium oxide by weight, (based on titanium dioxide), and the proportion of ammonium ions was equivalent to 14.5 percent by weight of ammonium sulphate (based on titanium dioxide). The filter cake was then calcined at 930°C. for 3 hours in a laboratory muffle furnace, yielding pigmentary titanium dioxide of which 98.4 percent was in the rutile crystallographic form. The proportion of magnesium present in the filter cake immediately before calcination being below the range hereinbefore specified, this pre-calcination treatment was outside the scope of the present invention.

Parts 3 to 13:
A mixed solution of potassium sulphate and the sulphate of one of the metals shown in the following Table was added to each of Parts 3 to 13. In each case, the resulting slurry was neutralised to pH 8.0 using a 30 percent solution of ammonia, and then filtered to remove excess water. The filter cakes were then calcined for 3 hours in a laboratory muffle furnace to yield pigmentary titanium dioxide. The following Table shows, for each of parts 3 to 13, the pre-calcination level of each of the metal sulphates (calculated as the metal oxide and based on TiO$_2$), the pre-calcination proportion of ammonium ions (calculated as ammonium sulphate and based on TiO$_2$), the calcination temperature employed, and the rutile content of the product pigment.

|  | Wt. % Present Prior to Calcination | | | Calcination temperature (°C) | Rutile Content (wt%) |
|---|---|---|---|---|---|
| Part No. | Metal Oxide | Potassium Oxide | ammonium compound as (NH$_4$)$_2$SO$_4$ | | |
| 3 | 0.02, MgO | 0.2 | 14.1 | 925 | 97.2 |
| 4 | 0.046, MgO | 0.2 | 14.9 | 920 | 98.0 |
| 5 | 0.5, MgO | 0.25 | 15.5 | 890 | 97.6 |
| 6 | 0.1, Al$_2$O$_3$ | 0.2 | 15.5 | 990 | 98.0 |
| 7 | 0.1, BeO | 0.2 | 15.4 | 870 | 96.0 |
| 8 | 0.1, ZnO | 0.2 | 14.8 | 840 | 97.8 |
| 9 | 0.01, Li$_2$O | 0.2 | 15.1 | 900 | 97.0 |
| 10 | 0.025, Li$_2$O | 0.2 | 14.4 | 875 | 95.4 |
| 11 | 0.05, Li$_2$O | 0.2 | 14.2 | 855 | 96.6 |
| 12 | 0.2, Li$_2$O | 0.2 | 15.2 | 820 | 98.2 |
| 13 | 0.7, ZnO | 0.1 | 15.6 | 780 | 98.6 |

Part 14:

A mixed solution of potassium sulphate and zinc sulphate was added to the slurry, which was then filtered to remove excess water. The amounts of potassium and zinc retained in the resulting filter cake were equivalent to 0.09 percent K$_2$O and 0.71 percent by weight of ZnO. The filter cake was calcined at 790°C for 3 hours in a laboratory muffle furnace to yield pigmentary titanium dioxide of which 98.8 percent was in the rutile form. The brightness and tinting strength of the samples of pigment obtained from each of the 14 parts are shown in the following Table. The brightness is given on the Adams system as described in Example 1 and the tinting strength is given in the Reynolds scale.

been obtained for Norwegian ilmenite by the sequence of steps described in Example 1, contained 225 grams/litre TiO$_2$, 71 grams/litre iron (II), 565 grams/litre sulphuric acid and 2.0 grams/litre trivalent titanium. The composition of the Norwegian ilmenite was as follows:

| | % by weight |
|---|---|
| TiO$_2$ | 44.9 |
| FeO | 32.9 |
| Fe$_2$O$_3$ | 13.4 |
| Al$_2$O$_3$ | 0.55 |
| V$_2$O$_5$ | 0.22 |
| Cr$_2$O$_3$ | 0.06 |
| Z$_r$O$_2$ | <0.1 |
| MnO | 0.3 |

A hydrolysis nucleating seed was prepared from a part of this liquor by the method described in Example 2, and the remainder of the liquor was then hydrolysed as described in that Example in the presence of 0.5 percent by weight of the nucleating seed to yield hydrous titanium dioxide.

The hydrous titanium dioxide was washed, and a quantity of rutile inducing nuclei was prepared from a

|  | Wt. % Present Prior to Calcination | | | Colour Brightness 'L' Value | Tinting Strength (Reynolds Scale) |
|---|---|---|---|---|---|
| Part No. | Metal Oxide | Potassium Oxide | Ammonium Compound as (NH$_4$)$_2$SO$_4$ | | |
| 1 | Nil | 0.21 | 15.0 | 93.3 | 1620 |
| 2 | 0.01, MgO | 0.2 | 14.5 | 93.6 | 1610 |
| 3 | 0.02, MgO | 0.2 | 14.1 | 96.3 | 1700 |
| 4 | 0.049, MgO | 0.2 | 14.9 | 97.5 | 1720 |
| 5 | 0.5, MgO | 0.25 | 15.5 | 97.6 | 1730 |
| 6 | 0.1, BeO | 0.2 | 15.4 | 96.4 | 1650 |
| 7 | 0.1, Al$_2$O$_3$ | 0.2 | 15.5 | 96.5 | 1600 |
| 8 | 0.1, ZnO | 0.2 | 14.8 | 97.3 | 1700 |
| 9 | 0.01, Li$_2$O | 0.2 | 15.1 | 94.7 | 1500 |
| 10 | 0.025, Li$_2$O | 0.2 | 14.4 | 97.3 | 1610 |
| 11 | 0.05, Li$_2$O | 0.2 | 14.2 | 97.5 | 1640 |
| 12 | 0.2, Li$_2$O | 0.2 | 15.2 | 97.4 | 1710 |
| 13 | 0.7, ZnO | 0.1 | 15.6 | 97.4 | 1480 |
| 14 | 0.71 ZnO | 0.09 | 0 | 97.5 | 1520 |

It will be seen that the pigments obtained in the comparison experiments, that is to say, the pigments obtained from parts 1, 2, 9, 13 and 14, have inferior brightness and/or tinting strength as compared with pigments produced from the remaining parts.

EXAMPLE 3

A titanium liquor suitable for hydrolysis that had part of the washed hydrolysate as described in Example 2.2 percent by weight (based on TiO$_2$) of this rutile inducing seed was then mixed into the main part of the washed hydrolysate.

A quantity of an aqueous solution of magnesium sulphate, equivalent to 0.05 percent by weight of magnesium oxide (based on TiO$_2$) was then added to a slurry of the seeded hydrolysate. After the addition of the magnesium sulphate, the slurry was neutralised to pH 9.0 with a 20 percent solution of ammonia, and dewatered by filtration. The resulting filter cake, which contained 0.05 percent by weight of magnesium compounds (calculated as MgO and based on $TiO_2$) and 22 percent by weight of ammonium ions (calculated as $[NH_4]_2SO_4$ and based on $TiO_2$), was then divided into four parts. The parts were then washed with demineralised water, each part being washed to a different extent so as to obtain four samples each having a different ammonium content. A quantity of sodium chloride solution, equivalent to 0.05 percent $Na_2O$ (based on $TiO_2$) was added to each of the washed samples, and the samples were then calcined at 860°C for 1½ hours in a laboratory muffle furnace to yield pigmentary titanium dioxide in the rutile crystallographic form. The rutile content, tinting strength, and texture of each pigment are given in the following Table, together with the proportion of ammonium ions present immediately before calcination.

| Part No. | Wt. % ammonium Compound as $(NH_4)_2SO_4$ present prior to calcination | % Rutile | Pigmentary Product Tinting Strength (Reynolds Scale) | Pigment Texture |
| --- | --- | --- | --- | --- |
| 1 | 4.2 | 98.0 | 1550 | Soft and Friable |
| 2 | 1.1 | 98.4 | 1470 | Fairly soft, readily grindable |
| 3 | 0.72 | 98.0 | 1460 | Fairly soft, readily grindable |
| 4 | 0.6 | 98.2 | 1270 | Relatively hard and gritty |

It will be seen that both the tinting strength and the texture of the product pigment are adversely affected by reducing the precalcination proportion of ammonium ions below 0.7 percent by weight.

EXAMPLE 4

A titanium sulphate liquor suitable for hydrolysis, that had been obtained by digestion of a mixture of equal parts of Norwegian and Australian ilmenite, followed by the solution, reduction, clarification, crystallisation, separation and evaporation steps described in Example 1, contained 226 grams/litre $TiO_2$ 73 grams/litre iron (II), 1.9 grams/litre trivalent titanium, and 575 grams/litre sulphuric acid. A hydrolysis nucleating seed was prepared from part of the liquor as described in Example 2, and 0.5 percent by weight of this seed was added to the main part of the liquor, which was then boiled for 3½ hours at constant volume under reflux to yield hydrous titanium dioxide.

The hydrous titanium dioxide was then washed with acidified water in order to reduce the concentration of iron and other impurities to as low a level as possible. After the washing treatment, an aqueous slurry of the hydrolysate was seeded with 3 percent by weight (based on $TiO_2$) of rutile inducing nuclei prepared as described in Example 2. The seeded hydrolysate was divided into three parts, each of which was subjected to a different pre-calcination treatment and was then calcined for 18 hours in an oil-fired rotary kiln. The pre-calcination treatments were as follows:-

Part 1:

A mixed solution of sodium sulphate and magnesium sulphate was added to the slurry, while agitating it thoroughly, and the slurry was then neutralised to pH 7.0 by the addition of a 35 percent solution of ammonia. After neutralisation, the slurry was de-watered by filtration; the resulting filter cake had a solids content of about 35 per cent, and contained sodium, magnesium, and ammonium compounds equivalent to 0.35 percent by weight $Na_2O$, 0.07 per cent by weight MgO and 11.2 percent by weight of $(NH_4)_2SO_4$, respectively (each percentage being based on $TiO_2$). The maximum calcination temperature was 860°C. The shape of the pigment so produced is shown in the electron micrograph reproduced in FIG. 1 of the accompanying drawings.

Figure 2:
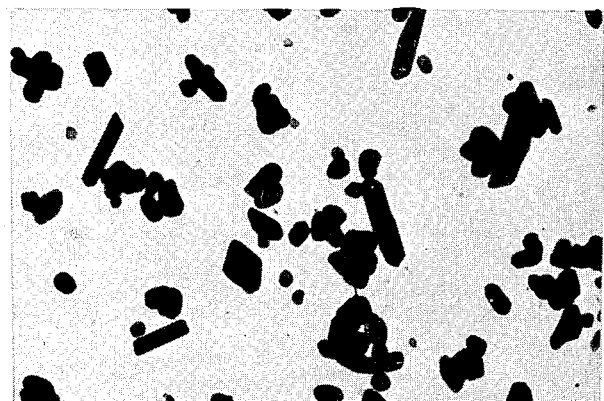

Part 2:

A mixed solution of zinc sulphate and potassium sulphate was added to the well-agitated slurry, which was then neutralised to pH 7.0 by means of 35 percent ammonia solution. The filter cake obtained on dewatering the neutralised slurry had a solids content of 35.5 percent and contained potassium, zinc and ammonium compounds equivalent to 0.2 percent by weight $K_2O$, 0.15 percent by weight ZnO, and 11.4 percent by weight $(NH_4)_2SO_4$, respectively (each percentage being based on $TiO_2$). The maximum calcination temperature was 850°C and the shape of the pigment so produced is shown in the electron micrograph reproduced in FIG. 2 of the accompanying drawings.

Figure 3:
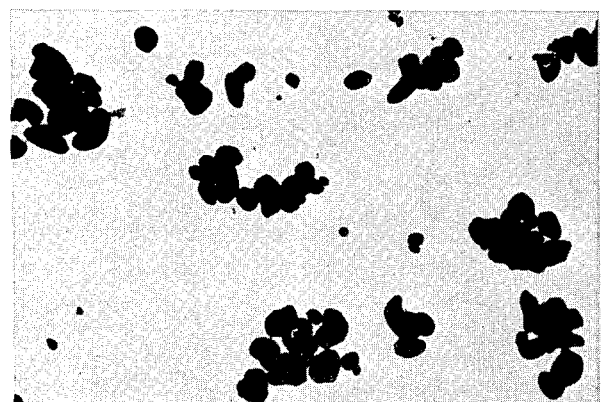

Part 3:

A mixed solution of zinc sulphate and potassium sulphate was added to the well-agitated slurry, which was then de-watered by filtration. The resulting filter cake contained 0.12 percent by weight of potassium (calculated as potassium oxide and based on titanium dioxide) and 0.8 percent by weight of zinc (calculated as ZnO and based on $TiO_2$). The maximum calcination temperature was 840°C, and the shape of the pigment so produced is shown in the electron micrograph reproduced in FIG. 3 of the accompanying drawings.

The tinting strength and texture of each sample of pigment is shown in the following Table:

| Part No. | Tinting Strength Reynolds Scale. | Texture |
| --- | --- | --- |
| 1 | 1730 | Very soft and friable, free from large lumps. |
| 2 | 1720 | Fairly soft and friable, free from large lumps. |
| 3 | 1550 | Moderately hard, large numbers of lumps present. |

The abrasiveness of each sample of pigment was measured as follows:

A dispersion was prepared comprising the pigmentary titanium dioxide, raw castor oil, and ethyl lactate in the ratio 5 : 3 : 6 by weight. 2 ml of this dispersion were coated onto a felt pad, one-fourth inch thick and 1 inch in diameter, attached to one side of a 1 inch diameter metal disc which was mounted on a central shaft located on the other side of the disc and extending perpendicular to the plane thereof. The shaft was then connected to a motor in such a manner that the disc could be rotated in a horizontal plane and such that a load could be applied to the disc by means of a weight located at the top of the shaft. A brass plate, 2 inches square and of known weight was placed under the felt surface and in contact with it. A load of 200 grams was applied to the disc and it was then rotated at a constant speed for a period of 2 hours. At 30 minute intervals, the brass plate was cleaned and weighed and the felt disc as impregnated with an additional 1 ml of the pigment dispersion before preceeding. The following Table shows the rate of loss of weight of the brass plate caused by each pigment, this rate being a measure of the abrasiveness of the pigment.

| Part No. | Weight loss |
|---|---|
| 1 | 38 milligrams/hour |
| 2 | 42 do. |
| 3 | 60 do. |

We claim:
1. In the manufacture of pigmentary titanium dioxide by a process which comprises:
   a. hydrolyzing a solution of titanium sulfate to yield a precipitate of hydrous titanium dioxide;
   b. washing the precipitate hydrous titanium dioxide;
   c. treating the washed precipitate with a treating agent selected from the group consisting of lithium; compounds of lithium; one of the group consisting of beryllium, aluminum, magnesium, zinc and compounds thereof with one of the group consisting of sodium, potassium, rubidium, caesium and compounds thereof; and mixtures thereof;
   d. treating the washed precipitate with an ammonium compound; and
   e. calcining the treated precipitate obtained by steps (c) and (d) above in the presence of a rutile-promoting seed and at a temperature of from 750° to 1,000°C; and wherein the treated precipitated calcined has a pH within the range of from 6 to 10 and contains from 0.02 to 0.50 percent by weight of treating agent selected from the group consisting of beryllium, aluminum, magnesium, zinc, compounds thereof and mixtures thereof (calculated as metal oxide and based on the weight of titanium dioxide), and from 0.05 to 1.0 percent by weight of treating agent selected from the group consisting of sodium, rubidium, caesium, potassium, compounds thereof and mixtures thereof (calculated as metal oxide and based on the weight of titanium dioxide), provided that any proportion of said beryllium, aluminum, magnesium, zinc, sodium, potassium, rubidium, caesium, compounds thereof and mixtures thereof required to be present in the treated precipitate calcined as hereinbefore stated, may be substituted for with an equal proportion of a compound selected from the group consisting of lithium, lithium compounds and mixtures thereof, the improvement which comprises; providing in the treated precipitated to be calcined at least 0.7 percent by weight of an ammonium compound (calculated as ammonium sulfate and based on the weight of titanium dioxide) and then expelling said ammonium compound and any decomposition product thereof from the precipitate during calcination before any substantial conversion of the titanium dioxide hydrolysate into rutile titanium dioxide takes place.

2. A process according to claim 1 wherein the quantity of ammonium compound provided is at least 4 percent by weight.

3. A process according to claim 1 wherein the quantity of ammonium compound provided does not exceed 15 percent by weight.

4. A process according to claim 1 wherein the ammonium compound provided is selected from the group consisting of ammonium hydroxide and ammonium carbonate.

5. A process according to claim 1 wherein said treating agent is selected from mixtures of zinc with sodium, zinc with sodium compounds, sodium with zinc compounds and sodium compounds with zinc compounds.

6. A process according to claim 1 wherein the treated precipitate calcined contains from 0.05 to 0.25 percent by weight of zinc (calculated as zinc oxide and based on titanium dioxide) and from 0.1 to 0.3 percent by weight of sodium (calculated as sodium oxide and based on titanium dioxide.

7. A process according to claim 1 wherein said ammonium compound is an alkaline ammonium compound.

* * * * *